(12) United States Patent
Xue

(10) Patent No.: US 7,734,145 B2
(45) Date of Patent: Jun. 8, 2010

(54) SYSTEM AND METHOD OF PATCHING MISSING DIGITAL VIDEO PACKETS COMMUNICATED IN AN IEEE 1394 COMPLIANT IMPLEMENTATION

(75) Inventor: Xin Xue, San Jose, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 0 days.

(21) Appl. No.: 11/405,907

(22) Filed: Apr. 17, 2006

(65) Prior Publication Data
US 2006/0187351 A1  Aug. 24, 2006

Related U.S. Application Data

(63) Continuation of application No. 09/599,066, filed on Jun. 21, 2000, now Pat. No. 7,065,288.

(51) Int. Cl.
*H04N 5/93* (2006.01)
(52) U.S. Cl. ............ 386/52; 386/111; 386/124; 348/207.1
(58) Field of Classification Search .............. 386/52, 386/55, 124, 95, 111; 348/616, 207.1
See application file for complete search history.

(56) References Cited

U.S. PATENT DOCUMENTS

| | | | |
|---|---|---|---|
| 4,626,912 A | 12/1986 | Wilkinson | |
| 5,159,452 A * | 10/1992 | Kinoshita et al. | 348/466 |
| 5,367,341 A | 11/1994 | Schnorf | |
| 5,418,571 A * | 5/1995 | Ghanbari | 375/240.16 |
| 5,621,467 A * | 4/1997 | Chien et al. | 348/616 |
| 5,862,517 A * | 1/1999 | Honey et al. | 702/85 |
| 5,896,402 A * | 4/1999 | Kurobe et al. | 370/216 |
| 5,986,714 A * | 11/1999 | Marino | 375/240.05 |
| 6,005,613 A | 12/1999 | Endsley et al. | |
| 6,067,323 A * | 5/2000 | Imura | 348/512 |
| 6,144,411 A | 11/2000 | Kobayashi et al. | |
| 6,282,462 B1 | 8/2001 | Hopkins | |
| 6,369,859 B1 * | 4/2002 | Watkins | 348/616 |
| 6,452,610 B1 | 9/2002 | Reinhardt et al. | |
| 6,600,835 B1 | 7/2003 | Ishikawa | |
| 2004/0076401 A1 | 4/2004 | Hallberg et al. | |

* cited by examiner

*Primary Examiner*—Vincent Boccio

(57) ABSTRACT

The present invention is a system and method that facilitates the reduction of presentation glitches in a digital video system. The present invention is a system and method that automatically determines if digital video (DV) data is missing from a stream of DV information and replaces or patches missing DV data with appropriate information to reduce the appearance of interruptions in the video (e.g., glitches in presentations). A communication packet carrying application data is received by an application data patching computer system. In one embodiment of the present invention, an IEEE standard 1394 compliant isochronous packet carrying digital video information is received. The application data (e.g., DV information) is separated from other communication packet protocol data (e.g., IEEE standard 1394 compliant header information). The received application data is analyzed to determine if it conforms to configuration constraints of predetermined application data format requirements. In one exemplary implementation, the initial information included in the application data section of the communication packet is analyzed to determine if it appropriately (e.g., sequentially) follows the information in previously received communication packet in accordance with predefined configuration definitions. If the information does not appropriately (e.g., sequentially) follow the information in previously received communication packet, a data patch is provided for lost or missing application data.

12 Claims, 9 Drawing Sheets

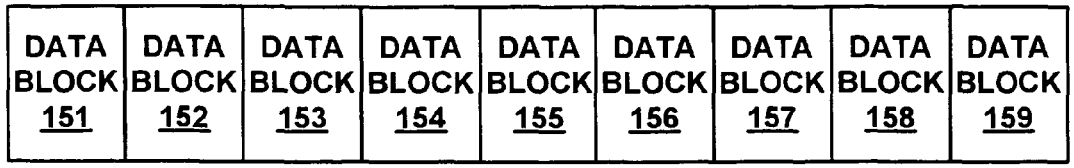
FIGURE 1A
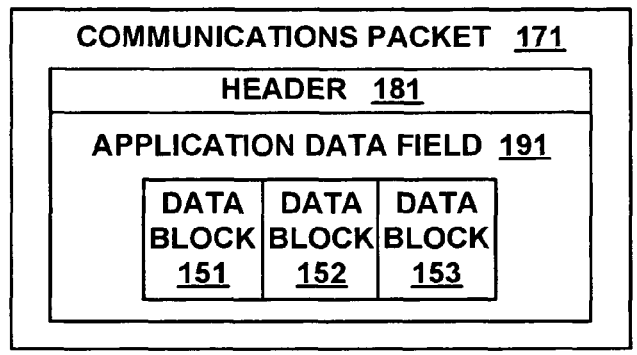
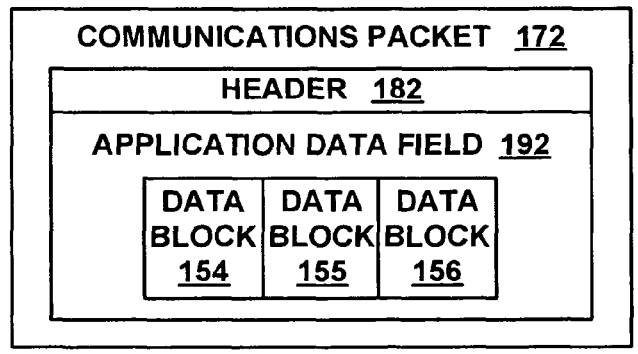
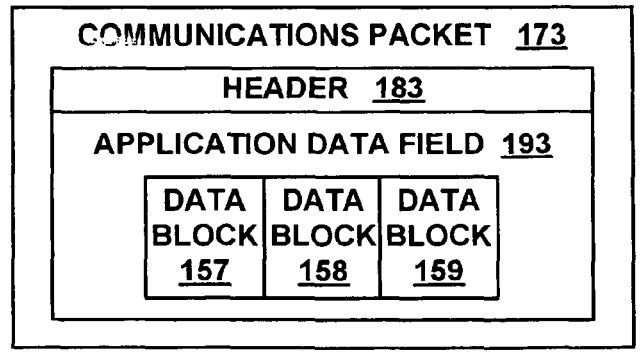
FIGURE 1B

Data structure for transmission

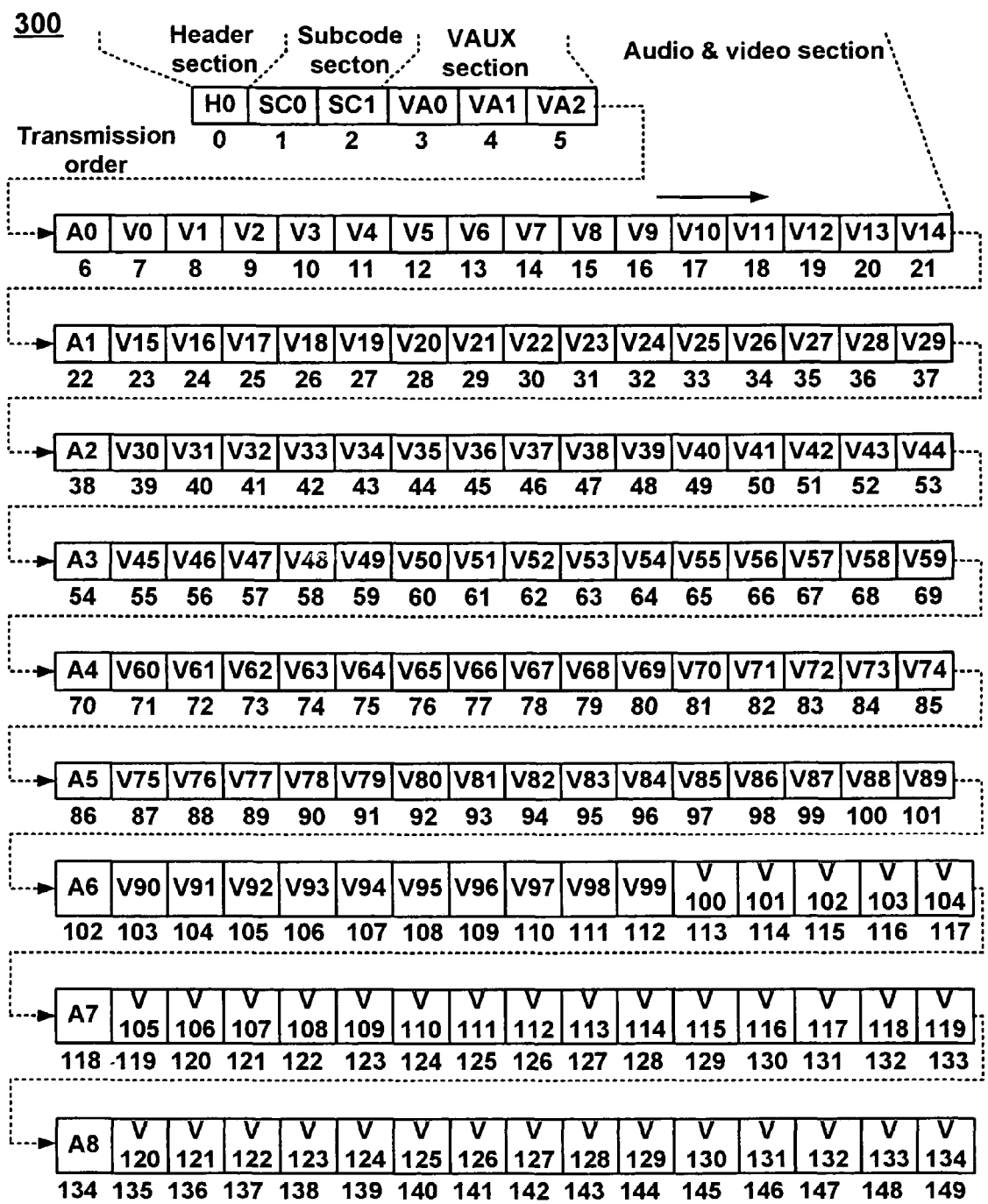
 DIF block
Transmission order of DIF blocks in a DIF sequence
FIGURE 3

|  | 0<br>ID0 | 1<br>ID1 | 2<br>ID2 |
|---|---|---|---|
| MSB | SCT 2<br>SCT 1<br>SCT 0 | Dseq 3<br>Dseq 2<br>Dseq 1<br>Dseq 0 | DBN 7<br>DBN 6<br>DBN 5<br>DBN 4<br>DBN 3<br>DBN 2<br>DBN 1<br>DBN 0 |
|  | RSV | | |
|  | Seq 3<br>Seq 2<br>Seq 1<br>Seq 0 | 0 | |
| LSB | | RSV<br>RSV<br>RSV | |

FIGURE 4

TABLE 1 - DIF BLOCK TYPE

| SCT 2 | SCT 1 | SCT 0 | SECTION TYPE |
|---|---|---|---|
| 0 | 0 | 0 | HEADER |
| 0 | 0 | 1 | SUBCODE |
| 0 | 1 | 0 | VAUX |
| 0 | 1 | 1 | AUDIO |
| 1 | 0 | 0 | VIDEO |
| 1 | 0 | 1 | RESERVED |
| 1 | 1 | 0 | |
| 1 | 1 | 1 | |

FIGURE 5

TABLE 2 - DIF SEQUENCE NUMBER (525-60 SYSTEM)

| Dseq 3 | Dseq 2 | Dseq 1 | Dseq 0 | MEANING |
|---|---|---|---|---|
| 0 | 0 | 0 | 0 | DIF SEQUENCE 0 |
| 0 | 0 | 0 | 1 | DIF SEQUENCE 1 |
| 0 | 0 | 1 | 0 | DIF SEQUENCE 2 |
| 0 | 0 | 1 | 1 | DIF SEQUENCE 3 |
| 0 | 1 | 0 | 0 | DIF SEQUENCE 4 |
| 0 | 1 | 0 | 1 | DIF SEQUENCE 5 |
| 0 | 1 | 1 | 0 | DIF SEQUENCE 6 |
| 0 | 1 | 1 | 1 | DIF SEQUENCE 7 |
| 1 | 0 | 0 | 0 | DIF SEQUENCE 8 |
| 1 | 0 | 0 | 1 | DIF SEQUENCE 9 |
| 1 | 0 | 1 | 0 | NOT USED |
| 1 | 0 | 1 | 1 | NOT USED |
| 1 | 1 | 0 | 0 | NOT USED |
| 1 | 1 | 0 | 1 | NOT USED |
| 1 | 1 | 1 | 0 | NOT USED |
| 1 | 1 | 1 | 1 | NOT USED |

FIGURE 6

TABLE 3 - DIF SEQUENCE NUMBER (625-50 SYSTEM)

| Dseq 3 | Dseq 2 | Dseq 1 | Dseq 0 | MEANING |
|---|---|---|---|---|
| 0 | 0 | 0 | 0 | DIF SEQUENCE 0 |
| 0 | 0 | 0 | 1 | DIF SEQUENCE 1 |
| 0 | 0 | 1 | 0 | DIF SEQUENCE 2 |
| 0 | 0 | 1 | 1 | DIF SEQUENCE 3 |
| 0 | 1 | 0 | 0 | DIF SEQUENCE 4 |
| 0 | 1 | 0 | 1 | DIF SEQUENCE 5 |
| 0 | 1 | 1 | 0 | DIF SEQUENCE 6 |
| 0 | 1 | 1 | 1 | DIF SEQUENCE 7 |
| 1 | 0 | 0 | 0 | DIF SEQUENCE 8 |
| 1 | 0 | 0 | 1 | DIF SEQUENCE 9 |
| 1 | 0 | 1 | 0 | DIF SEQUENCE 10 |
| 1 | 0 | 1 | 1 | DIF SEQUENCE 11 |
| 1 | 1 | 0 | 0 | NOT USED |
| 1 | 1 | 0 | 1 | NOT USED |
| 1 | 1 | 1 | 0 | NOT USED |
| 1 | 1 | 1 | 1 | NOT USED |

FIGURE 7

SYSTEM AND METHOD OF PATCHING MISSING DIGITAL VIDEO PACKETS COMMUNICATED IN AN IEEE 1394 COMPLIANT IMPLEMENTATION

This patent application is a Continuation of commonly-owned patent application Ser. No. 09/599,066, filed on Jun. 21, 2000 now U.S. Pat. No. 7,065,288, entitled "A SYSTEM AND METHOD OF PATCHING MISSING DIGITAL VIDEO PACKETS COMMUNICATED IN AN IEEE 1394 COMPLIANT IMPLEMENTATION" by Xin Xue, which is incorporated herein by this reference.

FIELD OF THE INVENTION

The present invention relates to the field of a digital video (DV) systems and methods. More particularly, the present invention relates to a system and method for patching digital video information lost during communication packet transmissions in an IEEE 1394 compliant system.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to produce these results often include digital video technologies that provide images and audio. Usually, quality video presentations without glitches require sequentially continuous data streams of digital video information.

Video presentations are typically a very efficient way to present significant amounts of information to an audience. For example, videos capture events and occurrences that are presented to people that were not present when the video was taken. Watching and listening to a video of an event or occurrence provides a virtual first hand experience permitting a viewer to form their own impressions about the event or occurrence. The ability to accurately perceive the information is greatly dependent upon the quality of the presentation. Digital video technologies usually have the potential to provide high quality presentations and typically provide significant presentation manipulation capabilities. However, one of the greatest degradations to effective presentation of video information results from glitches or gaps in the streaming of the visual and audio data.

Typically, digital video technologies involve a number of devices arranged in a variety of configurations. Usually, several of the devices have to communicate with each other in order to perform properly. For example, a digital video camera that captures information associated with images and sounds typically communicates the information to a processor for processing and a storage medium for storage. Communications between a digital video camera and other electronic devices usually have to conform to a communication protocol in order for the devices to understand the communicated information.

An organization that specifies standards for the electronics industry is the Institute of Electrical and Electronics Engineers (IEEE). One standard the IEEE has promulgated is the IEEE 1394 communication protocol standard, which primarily specifies conventions for high speed serial system communications. Communications transmitted in accordance with the IEEE 1394 communication protocol standard are often communicated between computer systems, audio and video products, printers, scanner products, hard disks (especially raid arrays) and digital video camera recorders. In particular, the IEEE 1394 communication protocol standard is often utilized in the transmission of information associated with digital video technology. Usually, the video data is transmitted in an IEEE 1394 communication protocol compliant isochronous packet.

It is common for a certain percentage of communication packets to be lost or discarded during transmission from a source to a destination. When digital video data is transmitted in accordance with IEEE 1394 communication protocol standards in isochronous packets, the real time digital video data is incorporated in the data-portion of a Common Isochronous Packet (CIP). There are a number of reasons that a communication packet may be lost or discarded such as hardware or processing problems. When a communication packet is lost or discarded, the underlying data (e.g., video information) being communicated is lost or distorted. If the underlying data carried by a lost or discarded communication packet is digital video information, there is usually a resulting glitch or gap (e.g., chopped frames) in the presentation such as a chopped frame or other distortion to the presentation.

Accordingly, what is required is a system and method that reduces adverse presentation impacts resulting from missing digital video information carried in lost or discarded communications packets configured in accordance with IEEE 1394 communications protocol standards.

SUMMARY OF THE INVENTION

The present invention is a system and method that facilitates reducing of presentation glitches in a digital video system. The present invention is a system and method that automatically determines if digital video (DV) data is missing from a stream of DV information. The present invention also replaces or patches missing DV data with appropriate information to reduce the appearance of interruptions in the video (e.g., glitches in presentations). By replacing or patching missing DV data with appropriate information, the present invention reduces adverse presentation impacts resulting from missing digital video information carried in lost or discarded communications packets configured in accordance with IEEE 1394 communications protocol standards.

The present invention is a system and method that facilitates the reduction of presentation glitches in a digital video system. The present invention is a system and method that automatically determines if digital video (DV) data is missing from a stream of DV information and replaces or patches missing DV data with appropriate information to reduce the appearance of interruptions in the video (e.g., glitches in presentations). A communication packet carrying application data is received by an application data patching computer system. In one embodiment of the present invention, an IEEE standard 1394 compliant isochronous packet carrying digital video information is received. The application data (e.g., DV information) is separated from other communication packet protocol data (e.g., IEEE standard 1394 compliant header information). The received application data is analyzed to determine if it conforms to configuration constraints of predetermined application data format requirements. In one exemplary implementation, the initial information included in the application data section of the communication packet is analyzed to determine if it appropriately (e.g., sequentially) follows the information in previously received communication packet in accordance with predefined configuration definitions. If the information does not appropriately (e.g., sequentially) follow the information in previously received communication packet, a data patch is provided for lost or missing application data.

In one embodiment of the present invention, an IEEE 1394 communication protocol compliant isochronous packet carrying digital video information is received. A DV data information patching system and method of the present invention determines if the digital video information included in a communication frame appropriately follows previously received digital video information. In one exemplary implementation, the present invention DV data information patching system and method utilizes predetermined configuration standards (e.g., a National Television System Committee (NTSC) or Phase Alternating Line (PAL) DV frame format) to extrapolate if DV information is missing. If the digital video information does not appropriately follow previously received information, the present invention patches the missing digital video information with properly configured default information (e.g., system specific codec defaults).

BRIEF DESCRIPTION OF THE DRAWINGS

The accompanying drawings which are incorporated in and form a part of this specification, illustrate embodiments of the invention and together with the description, serve to explain the principles of the invention:

FIG. 1A is a block diagram of application data included in one embodiment of the present invention.

FIG. 1B is a block diagram of communications packets included in one embodiment of the present invention

FIG. 3 is a block diagram illustration showing the transmission order of digital interface (DIF) blocks in a DIF sequence.

FIG. 4 is a table illustrating the relationship of bits in one exemplary DIF block identification (ID) section to information associated with a section type (SCT), a sequence number (seq), a DIF sequence number (Dseq) and a DIF block number (DBN).

FIG. 5 includes a DIF block table that illustrates the correlation between the DIF block ID section bits SCT0 through SCT2 and the section type.

FIG. 6 is a table illustrating the DIF sequence definition for NTSC.

FIG. 7 is a table illustrating the DIF sequence definition for PAL.

DETAILED DESCRIPTION OF THE INVENTION

Figure 1C:
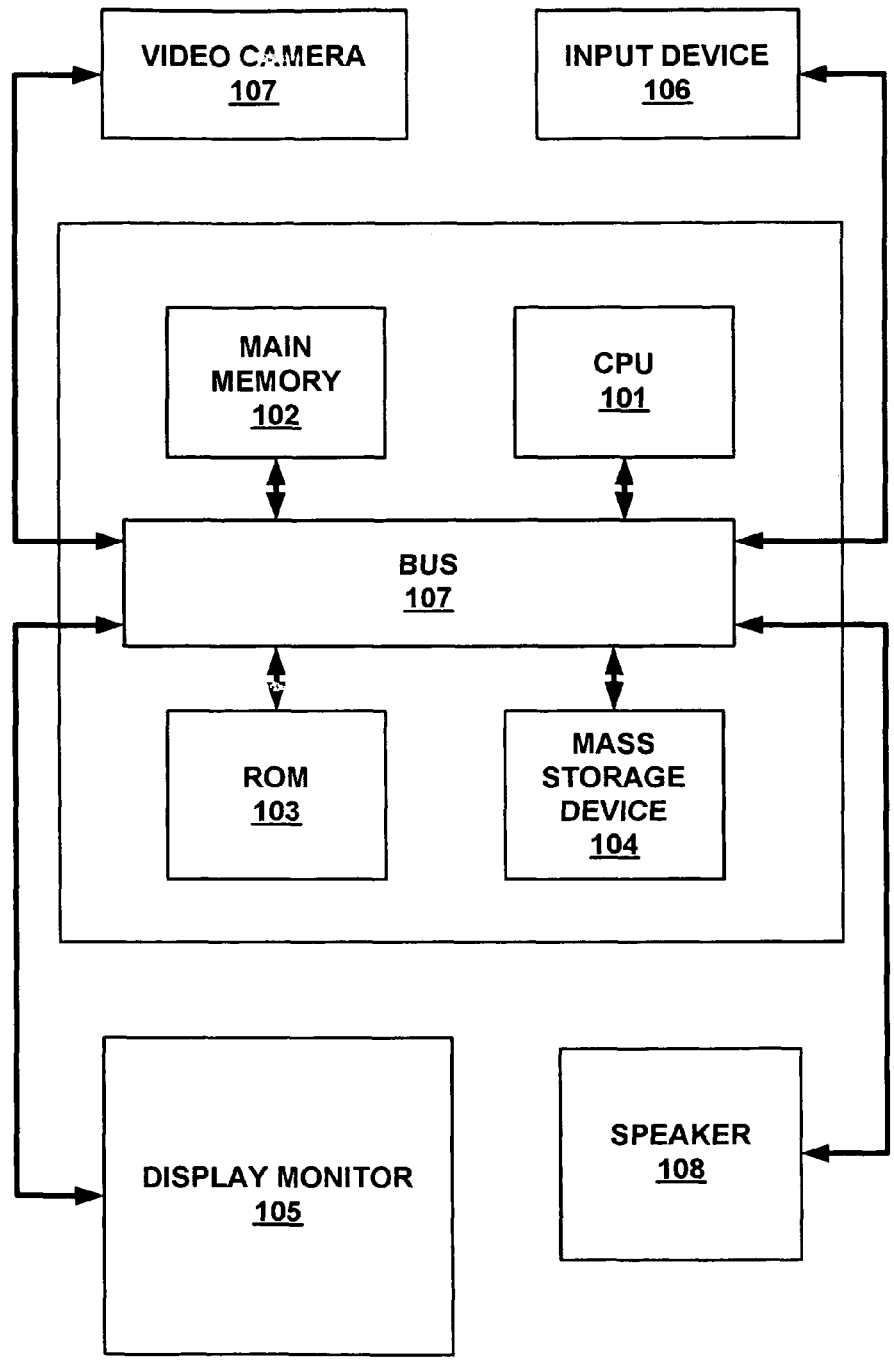
FIG. 1C is a block diagram of a digital video computer system that utilizes the present invention.

Reference will now be made in detail to the preferred embodiments of the invention, a system and method of patching missing digital video information, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a system and method of reducing adverse affects associated with missing application data (e.g., digital video information). The application data patching system and method of the present invention facilitates a determination of whether application data is missing and inserts a data patch for missing data. In one exemplary implementation, application data (e.g., digital video information) is carried in communication packets that are lost or discarded during transmission. The present invention separates the application data from other information associated with the communication packet protocol and then analyzes the application data configuration to determine if the application data properly follows previously received application data. In one embodiment of the present invention, the application data patching system and method determines if a segment or block of application data conforms to the ordering constraints of predetermined application data configuration requirements. If the application data under analysis does not properly follow previously received application data, the present invention inserts appropriate default information. In one embodiment of the present invention, the appropriate default information includes proper data configuration (e.g., sequencing) information and null set information. In one exemplary implementation, null set information does not cause the application to perform a specific function but does provide "filler" information that facilitates the reduction of processing problems.

FIG. 1A is a block diagram of application data 150. Application data 150 comprises application data blocks 151 through 159. In one embodiment of the present invention, application data 150 includes digital video information. Application data 150 is communicated between a plurality of electronic devices in communication packets. The application data field included in the communications packets is not large enough to accommodate all of application data 150 in a single communications packet. FIG. 1B is a block diagram of communications packets 171 through 173. Communication packet 171 comprises header 181 and application data field 191 which includes application data blocks 151 through 153. Communication packet 172 comprises header 182 and application data field 192 which includes application data blocks 154 through 156. Communication packet 173 comprises header 183 and application data field 193 which includes application data blocks 157 through 159.

Application data 150 is transmitted to an electronic device in communications packets 171 through 173. The present invention separates the application data in each received communication packet from other information associated with the communication packet protocol. For example, a present invention application data patching system and method receives communication packet 171 and separates header 181 from application data blocks 151 through 153. The application data patching system and method also receives communication packet 173 and separates header 183 from application data blocks 157 through 159. The present invention then analyzes the received application data blocks to determine if they conform to the ordering constraints of predetermined application data configuration requirements. Since application block 157 does not sequentially follow application data block 153 the present invention determines that communications packet 172 is lost and its associated application data (application data blocks 154 through 156) are missing. The present invention application data patching system and method patches application data default information for missing application data blocks 154 through 156.

FIG. 1C is a block diagram of digital video computer system 100, one embodiment of a computer system that utilizes the present invention. In general, digital video computer system 100 comprises bus 107, central processor (CPU) 101, random access memory 102, read only memory 103, data storage device 104, display device 105, alphanumeric input device 108, digital video camera 107, and speaker 109. Bus 107 is coupled to CPU 101, random access memory 102, read only memory 103, data storage device 104, display device 105, alphanumeric input device 108, digital video camera 107 and speaker 109.

The components of digital video computer system 100 cooperatively operate to perform their designated functions. CPU 101 processes information and instructions. Random access memory 102 stores information and instructions for CPU 101 in an easily assessable format. Read only memory 103 stores static information and instructions for CPU 101. Data storage device 104 (e.g., a magnetic or optical disk and disk drive) provides bulk storage for relatively larger quantities of information and instructions. Display device 105 displays information to a user. Alphanumeric input device 108 includes alphanumeric and function keys for communicating information and command selections to CPU 101. In one embodiment of the present invention, alphanumeric input device 108 includes a cursor control device for communicating user input information and command selections to CPU 101. Digital video camera 107 provides digital video information to CPU 101. Speaker 109 generates audio sounds. Bus 107 is a path for communicating information.

The components of computer system 100 comprise a variety of interchangeable embodiments. For example, the display device 105 of FIG. 1 may be a liquid crystal device, cathode ray tube, or other display device suitable for creating graphic images and alphanumeric characters recognizable to the user. It is also to be appreciated that there are many implementations of the cursor control device included in alphanumeric input device 108, including a trackball, mouse, joystick or a number of other specially adapted cursor directing devices for providing input to direct and/or activate the cursor. In one embodiment of the present invention the cursor control device is coupled to bus 107 directly.

In one embodiment of the present invention, digital video camera 108 is utilized to capture video images and sounds. Digital video camera 108 includes a lens for capturing rays of light being generated by or reflected off of an object and a microphone to capture sound waves. The rays of light are captured by a transparent lens that directs the light onto a photosensitive material (e.g., a charge coupled device). The light rays alter the photosensitive material in a manner that generates an electrical charge when it is struck by the light rays. The electrical charges are processed into electrical signals. The microphone includes a transducer that generates electrical signals corresponding to sound waves received by the microphone. The electrical signals from the photosensative material and audio transducer represent video information. The video information is communicated to a storage device (e.g., ROM 103) or presentation device (e.g., display device 105 or speaker 109).

Figure 2:
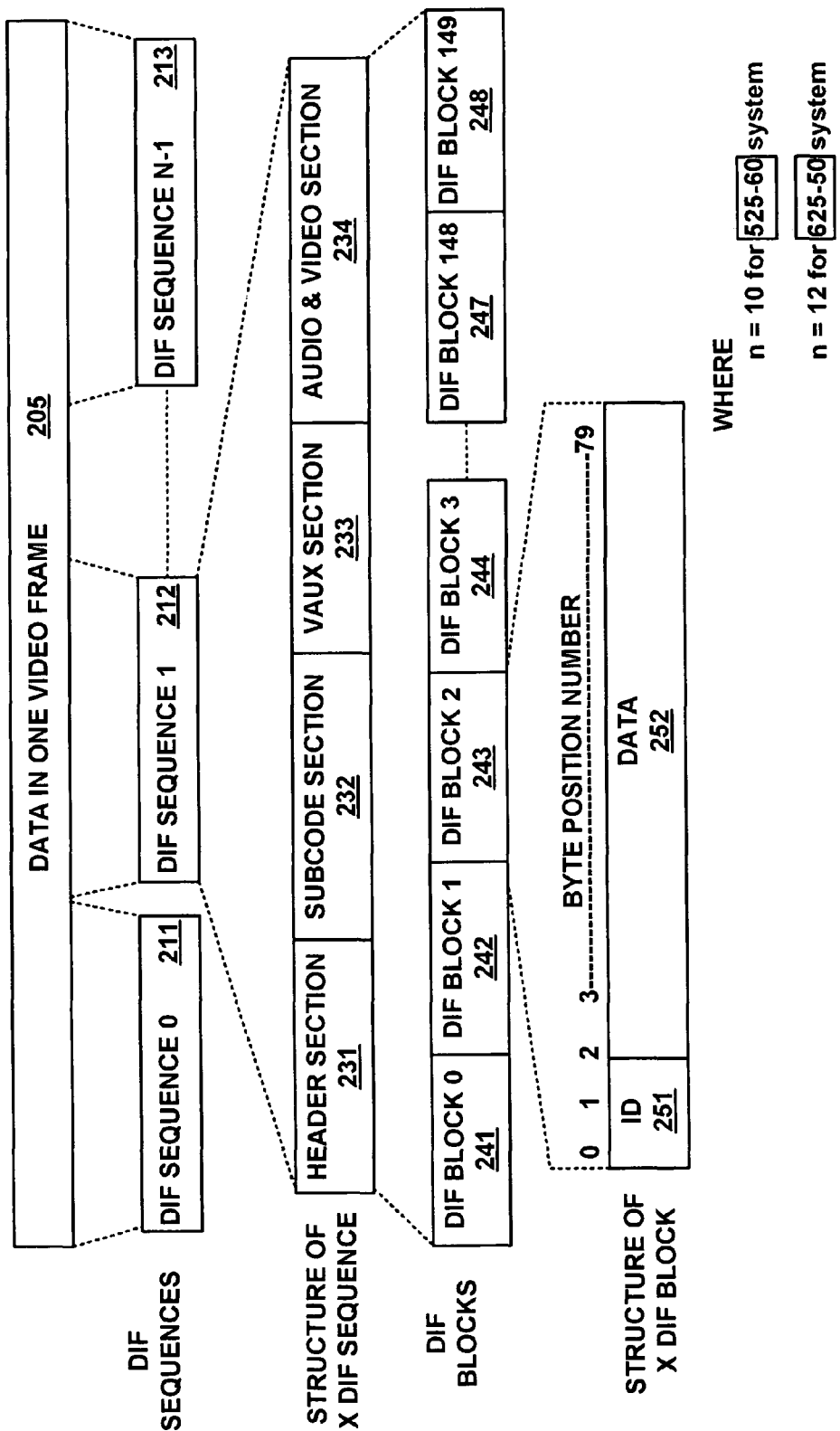
FIG. 2 is a block diagram of one exemplary hierarchical data format utilized by the present invention for transmitting information associated with a digital video frame.

In one implementation of the present invention, video information is configured in a unit referred to as a video frame. In one National Television System Committee (NTSC) exemplary implementation of the present invention, a video frame includes 120,000 bytes of interwoven information including image, audio and instruction information. FIG. 2 is a block diagram of one exemplary hierarchical data format of information associated with a DV frame 205. DV frame 205 comprises ten Digital Interface (DIF) sequences including DIF sequence 211, DIF sequence 212 and DIF sequence 213. Each DIF sequence comprises a header section, subcode section, VAUX section and audio/video section that are broken down into DIF blocks. For example, DIF sequence 212 comprises header section 231, subcode section 232, VAUX section 233 and audio/video section 234 that are broken down into 150 DIF blocks 241 through 248. In one embodiment of the present invention there are 150 DIF blocks in each DIF sequence and eighty bytes of information in each DIF block. Each DIF block in FIG. 2 includes an identification (ID) section and a data section. For example, DIF block 243 includes ID section 251 comprising three bytes of ID data (ID0, ID1 and ID2) and data section 252 comprising 77 bytes of data.

FIG. 3 is a block diagram illustration showing the configuration and transmission sequence of DIF blocks included in a DIF sequence in one DV frame 300. The header section of DV frame 300 includes a header DIF block H0 followed by subcode section DIF blocks SC0 and SC1. The VAUX section includes DIF blocks VA0, VA1 and VA2. Audio/video section comprising DIF blocks A0 through A8 and V0 through V134.

In one embodiment of the present invention, an ID segment of a DIF block includes information associated with a section type (SCT), a sequence number (seq), a DIF sequence number (Dseq) and a DIF block number (DBN). FIG. 4 is a table illustrating the relationship of bits in one exemplary DIF block ID segment to information associated with a section type (SCT), a sequence number (seq), a DIF sequence number (Dseq) and a DIF block number (DBN). The four least significant bits of DIF block ID section byte ID0 comprises bits identifying a DIF sequence included in a video frame (e.g., bits Seq0, Seq1, Seq2, and Seq3). The four most significant bits of ID data byte ID0 comprise bits that identify a section type (e.g., bits SCT0, SCT1 and SCT2). The four most significant bits of DIF block ID section byte ID1 comprise bits identifying a DIF block within a DIF sequence (e.g., bits Dseq0, Dseq1, Dseq2, and Dseq3). The bits of DIF block ID section byte ID2 comprise data block number bits DBN0 through DBN7. FIG. 5 includes a DIF block type table that illustrates the correlation between the section ID bits SCT0 through SCT2 and the section type. FIG. 6 is a table illustrating the DIF sequence definition for a NTSC digital video frame configuration. FIG. 7 is a table illustrating the DIF sequence definition for Phase Alternating Line (PAL) digital video frame.

The data for a video frame is communicated between the components of digital video camera computer system 100. One example of a video information transfer is the communication of information from a camcorder (e.g., digital video camera 107) to a personal computer CPU (e.g., CPU 101). In one embodiment of the present invention, the DV data is copied to a user buffer in an entire DV frame. The video frame data is communicated in different communication formats depending upon the implementation. In one exemplary implementation, digital video frame information is encapsulated and communicated in the application data portion of an IEEE 1394 communications protocol compliant isochronous packet. In one implementation of the present invention, an IEEE 1394 communications protocol compliant isochronous packet includes a common isochronous packet (CIP) comprising 8 header bytes and 480 data bytes. The 480 data bytes are associated with application data for a DV frame.

Figure 8B:
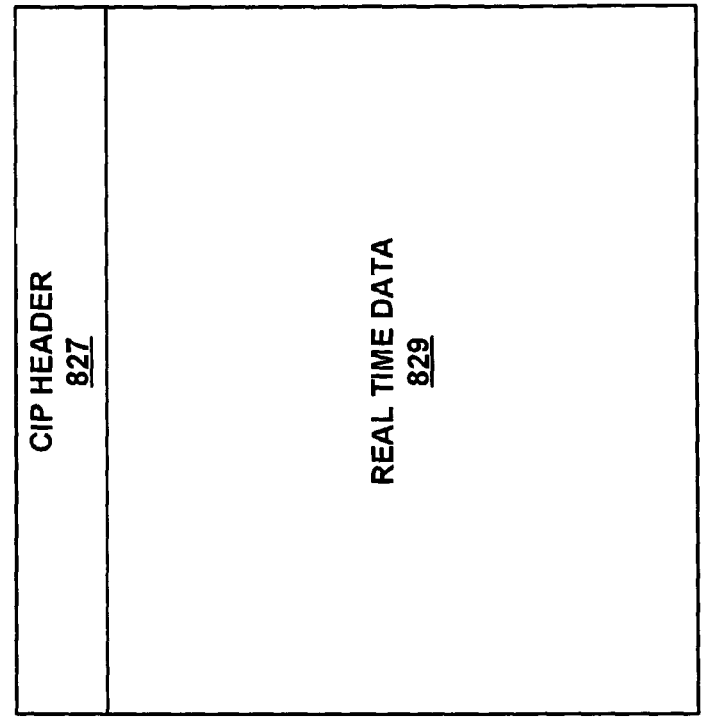
FIG. 8B is a block diagram of a data field configured to communicate digital video information comprising a CIP header section and real time digital video data section.
Figure 8A:
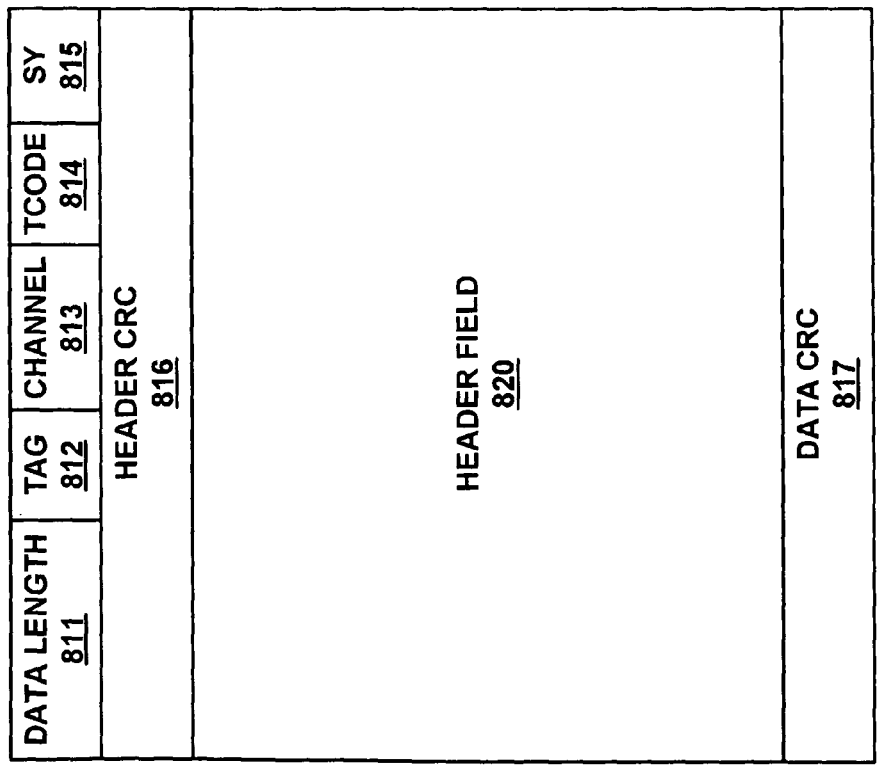
FIG. 8A is a block diagram showing the configuration of an IEEE standard 1394 complaint CIP, one embodiment of a CIP packet included in the present invention.

FIG. 8A is a block diagram showing the configuration of an IEEE 1394 communications protocol complaint isochronous packet 800, one embodiment of a communication packet included in the present invention. IEEE 1394 communications protocol complaint isochronous packet 800 comprises a data length section 811, a tag section 812, a channel section 813, a Tcode section 814, a SY section 815, a header cyclic redundancy check (CRC) section 816, data field section 820 and data CRC section 817. Data length section 818 defines the length of the packet. Tag section 812 defines the format of data carried by the isochronous packet. Channel section 813 identifies a communication channel number. Transaction code (Tcode) section 814 defines the transaction code for an isochronous data block. Synchronization (Sy) section 815 defines the synchronization code which is application specific. Header cyclic redundancy check (CRC) section 816 includes information associated with error detection and correction procedures for the packet. Data field section 820 includes a CIP. Data CRC section 817 includes information associated with error detection and correction procedures for the application data in the data field.

In one embodiment of the present invention, a CIP is utilized to communicate digital video (DV) data from one device (e.g., digital video camera 108) to another device (e.g., CPU 101). FIG. 8B is a block diagram of a data field 820 configured to communicate digital video information comprising a CIP header section 827 and real time digital video data section 829. In one embodiment of the present invention, real time digital video data section 820 includes 480 bytes of digital video information. In one exemplary implementation of the present invention, the real time digital video data section 829 is capable of accommodating or carrying a constant number of DIF blocks (e.g., six DIF blocks). Thus, the first DIF block included in each of sequential CIP data fields (e.g., CIP data field 829) falls within an integer number of DIF blocks of one another (e.g., six blocks). In one exemplary implementation, the order of the DIF blocks that start a CIP data field include one of the following 25 DIF blocks: H0, A0, V5, V11, V16, V22, V28, V33, A3, V50, V56, V61, V67, V73, V78, V84, A6, V95, V101, V106, V12, V118, V123, V129 (See FIG. 3). In one exemplary implementation, the present invention utilizes the predetermined DIF block configuration scheme to predict the DIF block identification of the first DIF block expected in the next sequential CIP data field.

If a CIP (e.g., CIP 800) carrying real time digital video information is lost during a transmission, the present invention determines real time digital video data section (e.g., real time digital video data section 829) DIF blocks are missing and patches appropriate data into processed video frame DIF blocks so that presentation glitches are reduced. For example, if the DIF block identification of a first DIF block in a group of six DIF blocks included in a CIP doesn't match the expected result, the present invention interprets the communication stream to be missing a CIP packet and fills in data to make the data stream smoother. In one embodiment of the present invention, the DV information included in one CIP packet is referred to as a DV packet. In one exemplary implementation in which DIF blocks are arranged as shown in FIG. 3, a DV packet comprises six status DIF blocks (e.g., H0, SC0, SC1, VA0 VA1, and VA2 blocks), or six audio and video DIF blocks (e.g., A0 through V4) or six video DIF blocks (e.g., V5 through V10).

In one exemplary implementation, the patch task performed by the present invention fills in appropriate information if a DV packet (e.g., six DIF blocks) is missing. Based on the predetermined design arrangement of DIF blocks for audio, video, header, subcode and VAUX, the present invention includes the following scheme to patch or fill in the missing data for the DV packet. If the missing packet includes the ID portion of a video frame (e.g., an ID segment or section of a DIF block), the present invention fills in the appropriate value for the sequence number bits (e.g., bits seq0, seq1, seq2, and seq4), reserved bit (e.g., bit rsv), DIF sequence number bits (e.g., Dseq0, Dseq1, Dseq2, and Dseq3), DIF block number bits (e.g., bits DBN0 through DBN7), and section type bits (e.g., bits SCT0, SCT1, and SCT2). These appropriate values are calculated to patch or fill in an appropriate sequential value based upon the video frame information included in the previous DV packet.

In one exemplary implementation of the present invention, the first DIF block of a DV packet received immediately before the currently received DV packet includes a DIF sequence number value of 1, DIF block number 0, and section type value of logical 000. The currently received DV packet included a DIF sequence number value of 1, DIF block number 5, and section video type value of logical 100. The present invention determines a DV packet is missing since the proper values for the currently received DV packet should be a DIF sequence number value of 1, DIF block number 0, and section type value of logical 011 (See FIGS. 3 and 4). In one exemplary implementation, the present invention compares the section type bits (SCT) and DIF block number bits (DBN) of a previously received packet to the SCT bits and DBN bits of a currently received DV packet. The present invention inserts a patch DV packet with the appropriate ID information (e.g., a DIF sequence number value of 1, DIF block number 0, and section type value of logical 011). The present invention patches or fills in a value of logical 1111 for the sequence number and a value of logical 1 for the reserved bit. In one embodiment of the present invention the patch value for the sequence number is based upon codec defaults of a particular system.

The present invention also patches or fills in missing DIF blocks associated with a data portion of a video frame. In one embodiment of the present invention, a hexadecimal value of "FF" is patched or filled in for video, VAUX0 through VAUX2, H0 and SC0 through SC1. In one exemplary implementation, the present invention fills in five bytes of hexadecimal value "FF" in the audio auxiliary data AAUX field and fills the remaining portion of the audio data field repeatedly with either 0X808080 (12 bit coding) or 0X80808080 (16 bit coding). The choice of either 0X808080 (12 bit coding) or 0X80808080 (16 bit coding) is based on the actual coding setting reflected in the quantization (QU) AAUX field in the A3 DIF block of DIF sequence number 0 when the first byte of AAUX equals 0X50. If the bits of QU are logical value "000" it is sixteen bit coding and if the bits of QU are a logical value "001" it is twelve bit coding.

In one embodiment of the present invention, the software architecture included in digital video camera computer system 100 comprises several layers in which an MS direct show filter sits on top of kernel module layers. The kernel module layers comprise a MS stream class driver, Sony DV mini driver, MS 1394 bus class driver and Sony 1394 port driver. The digital video frame assembly is performed at the SONY DV mini driver layer based upon video information communicated in an IEEE 1394 communications protocol compliant CIP. In one exemplary embodiment, the present invention patches or fills in missing DIF information at the SONY DV mini driver layer. The present invention determines which DIF block is missing and then fills in the ID part and data portion of each missing DIF block.

Figure 9:
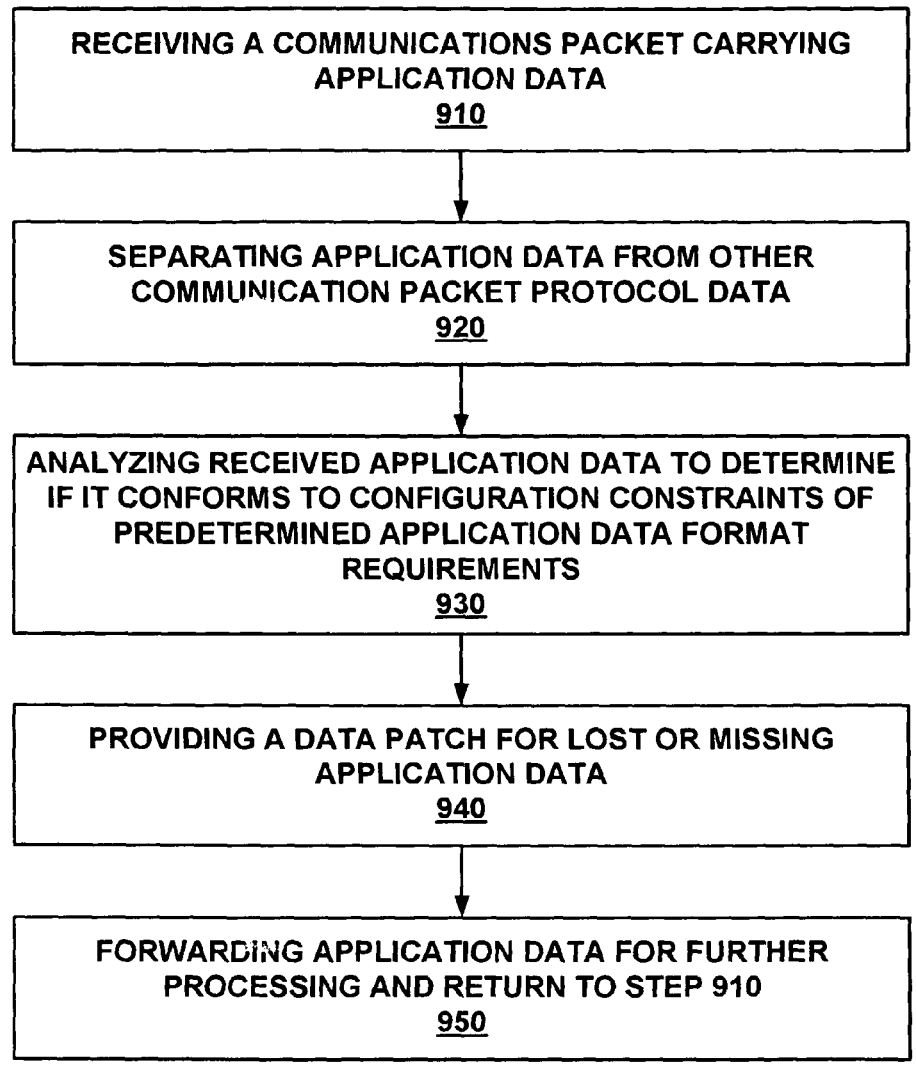
FIG. 9 is a flow chart of a missing application data patching method, one embodiment of the present invention.

FIG. 9 is a flow chart of missing application data patching method 900, one embodiment of the present invention. Missing application data patching method 900, facilitates the reduction of adverse affects associated with missing or discarded application data carried in communication packets. In one exemplary implementation, missing application data patching method 900, facilitates a determination if application data is lost during a communications transmission and inserts a compatible data patch when appropriate.

In step 910, a communication packet carrying application data is received. In one embodiment of the present invention, an IEEE standard 1394 compliant isochronous packet carrying digital video information is received. In one exemplary implementation the digital video information is configured in a NTSC format and in another implementation the information is configured in a PAL format.

In step 920, application data (e.g., DV information) is separated from other communication packet protocol data (e.g., IEEE standard 1394 compliant header information). In one embodiment of the present invention, this includes separating header information from application data field information.

In step 930, received application data (e.g., DV information) is analyzed to determine if it conforms to configuration constraints of predetermined application data format requirements. In one exemplary implementation, the initial information included in the application data section of the communication packet is analyzed to determine if it appropriately (e.g., sequentially) follows the information in previously received communication packet in accordance with predefined configuration definitions. If the information does not appropriately (e.g., sequentially) follow the information in previously received communication packet, DV information patching method 900 interprets the inconsistency to indicate a communication packet and its associated application data is lost or missing.

In step 940, a data patch is provided for lost or missing application data. In one embodiment of the present invention appropriate ordering information and default application data is provided. For example, in one implementation of the present invention, the patch task performed by the present invention fills in appropriate information if a DV packet (e.g., six DIF blocks) is missing. If the missing packet includes the ID portion of a video frame, the present invention fills in the appropriate value for the sequence number bits (e.g., bits seq0, seq1, seq2, and seq4), reserved bit (e.g., bit rsv), DIF sequence number bits (e.g., Dseq0, Dseq1, Dseq2, and Dseq3), DIF block number bits (e.g., bits DBN0 through DBN7), and section type bits (e.g., bits SCT0, SCT1, and SCT2). These appropriate values are calculated to patch or fill in an appropriate sequential value based upon the video frame information included in the previous DV packet. The present invention also patches or fills in missing DIF blocks associated with a data portion of a video frame. In one embodiment of the present invention, a hexadecimal value of "FF" is patched or filled in for other DIF blocks included in a video frame.

In step 950, application data is forwarded for further processing and DV information patching method 900 returns to step 910. The forwarded application data includes patch data provided in step 940.

In one embodiment of present invention, DV information patching method 900 includes a configuration option checking step (not shown). In the configuration option checking step, an application data configuration option is checked to ascertain if application data is configured in accordance with a particular option. In one exemplary implementation, the present invention fills in the first five bytes of hexadecimal value "FF" in an AAUX field and fills in the remainder of the AAUX field with either 808080 or 80808080 repeatedly. The choice of either 808080 or 80808080 is based on an analysis of a coding setting reflected in the QU AAUX field in the A3 DIF block of sequence number 0. If the bits of QU are logical value "000" it is sixteen bit coding and if the bits of QU are a logical value "001" it is twelve bit coding.

Figure 10:
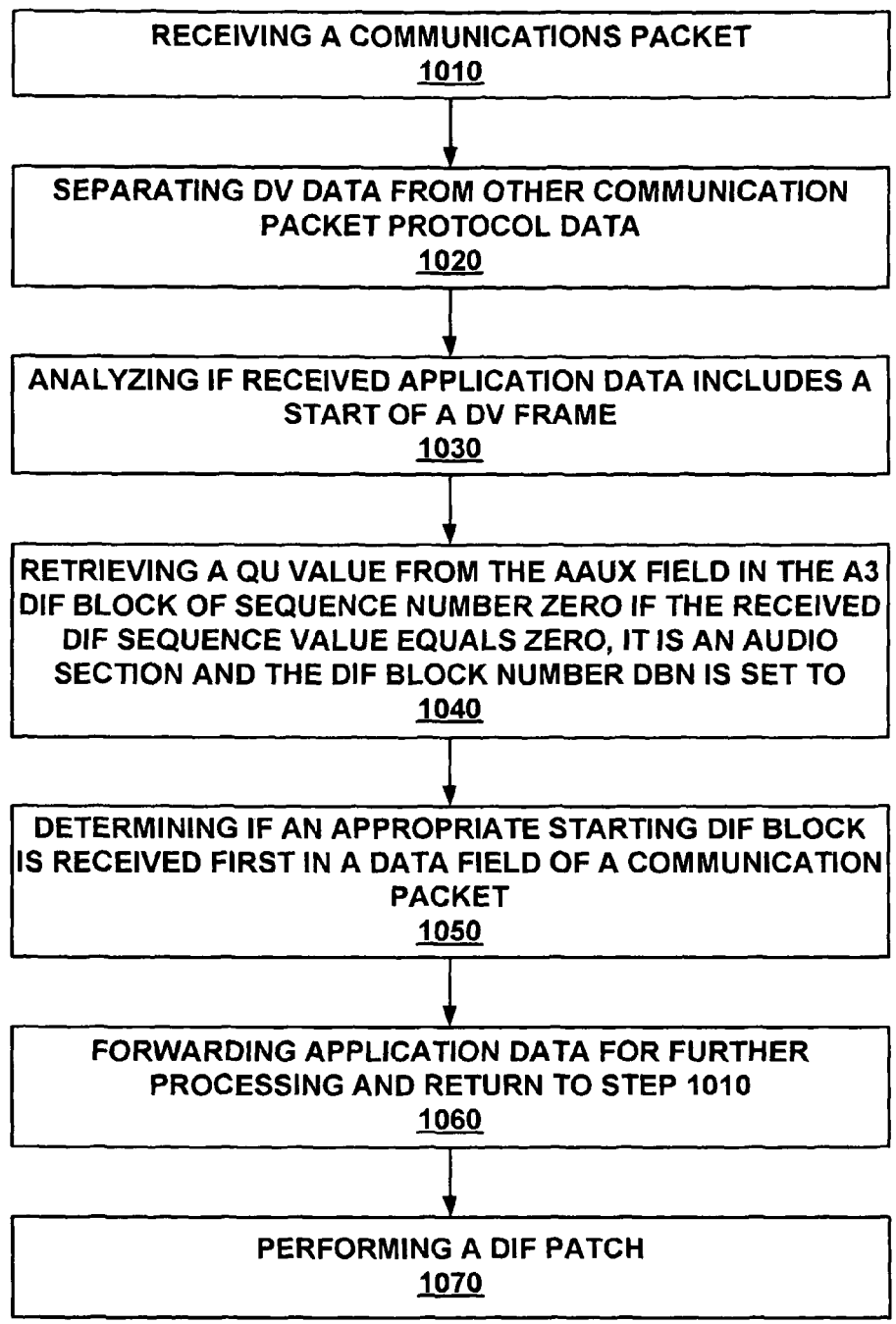
FIG. 10 is a flow chart of DV information patching method 1000, one embodiment of the present invention.

FIG. 10 is a flow chart of DV information patching method 1000 in one embodiment of the present invention. DV information patching method 1000 facilitates the reduction of adverse affects (e.g., glitches) associated with missing or discarded DV application data carried in communication packets. In one exemplary implementation, DV information patching method 1000 facilitates a determination if DV application data is lost during a communications transmission and inserts a compatible data patch when appropriate.

In step 1010, a communication packet is received. In one embodiment of the present invention, an IEEE standard 13104 compliant common isochronous packet (CIP) carrying digital video information is received. In one exemplary implementation the digital video information is configured in a NTSC format and in another implementation the information is configured in a PAL configuration.

In step 1020, application data (e.g., DV information) is separated from other communication packet (e.g., CIP) protocol data. In one embodiment of the present invention, this includes removing the data length section (e.g., data length section 811), tag section (e.g., tag section 812), channel section (e.g., channel section 213), Tcode section (e.g., Tcode section 814), Sy (e.g., Sy section 815), a header CRC section (e.g., header CRC section 816) and a data CRC section (e.g., data CRC section 817).

In Step 1030, DV information patching method 1000 analyzes if the received communication packet includes a start of a DV frame. In one embodiment of the present invention, DV information patching method 1000 determines if a communication packet includes a start of a DV frame by checking to ascertain if the Dseq bits (e.g., Dseq 0,1,2,3) and section type bits (e.g., sct0, sct1 and sct2) and the sequence bits are all logical zeroes (e.g., seq0, seq1, seq2 and seq3). If all these bits are logical zeroes, DV information patching method 1000 considers the received communication packet to include a start of a DV frame.

In Step 1040, a QU value is retrieved from AAUX field in the A3 DIF block of DIF sequence number zero when the first byte of AAUX equals to 0X50, it is an audio section and the DIF block number (DBN) is set to equal 0x03.

In Step 1050, a determination is made if an appropriate starting DIF block is received first in a communication packet. In one exemplary implementation, the present invention determines if information associated with a sequence (Seq), a DIF sequence number (Dseq) and a DIF block number (DBN) is sequentially continuous from a previously received communications packet.

In Step 1060, DV information patching method 1000 forwards the received communication packet for further processing if the section (SCT), DIF block number (DBN), and DIF sequence value (Dseq) match expected values and no patch is performed.

In Step 1070, DV information patching method 1000 performs a DIF patch if section type (SCT), a DIF sequence number (Dseq) and a DIF block number (DBN) does not match expected values. DV information patching method 1000 patches a DV packet comprising six status DIF blocks (e.g., H0, SC0, SC1, VA0 VA1, and VA2 blocks), or six audio and video DIF blocks (e.g., A0 through V4) or six video DIF blocks (e.g., V5 through V10) based upon the last DV packet information. After a patch is performed DV information patching method 1000 returns to step 1010.

Thus, the system and method of the present invention is a system and method that facilitates the reduction of presentation glitches. The present invention is a system and method that automatically determines if a digital video (DV) packet is missing from a video stream communication. The present invention also replaces missing packets with appropriate fill in information to reduce the appearance of interruptions in the streaming of information (e.g., glitches in presentations).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A digital video computer system comprising:
   a bus for communicating information;
   a digital video camera for capturing video information associated with an image and sound, said digital video camera coupled to said communications bus;
   a processor for determining if video information is missing and patching said missing video information, including sequential values based upon video frame information, said processor coupled to said communications bus, wherein said processor is also for determining if a segment or block of said video information conforms to ordering constraints of predetermined video information configuration requirements, and patching said segment or block of said video information without disposing of said segment or block entirely if said segment or block of said video information does not conform to ordering constraints of predetermined video information configuration requirements, wherein said patching includes performing an appropriate sequential DIF patch if section type (SCT), a DIF sequence number (Desq) and a DIF block number (DBN) are missing;
   a monitor for displaying said image, said monitor coupled to said communications bus; and
   a speaker for transmitting said sound, said speaker coupled to said communications bus.

2. The digital video computer system of claim 1 wherein said video information is encapsulated in a communications packet compliant with Institute of Electrical and Electronics Engineers (IEEE) 1394 communication protocol standard.

3. The digital video computer system of claim 2 wherein said processor is also for separating said video information from other information associated with said communication packet and analyzing the configuration of said video information to determine if said video information properly follows previously received video information.

4. The digital video computer system of claim 3 wherein said processor is also for inserting appropriate default information, including null set information, if said video information under analysis does not properly follow previously received video information.

5. The digital video computer system of claim 1 wherein said digital video camera forwards said video information to said processor, wherein said processor continues processing on said information in a video frame, wherein a portion of said information in said video frame is received from said digital video camera and a portion of said information in said video frame is patched information.

6. The digital video computer system of claim 1 wherein said patching information includes appropriate sequential ID information and data information from another portion of said current video frame is filled in for missing data information and the current video frame is processed.

7. A missing application data patching method comprising the steps of:
   a) receiving a communication packet carrying application data;
   b) separating application data from other communication packet protocol data;
   c) analyzing received application data to determine if it complies with expected predefined data configuration;
   d) providing a data patch for lost or missing application data including sequential values based upon video frame information, wherein said sequential values are calculated based upon a previous video frame and said sequential values include the current frame and wherein said data patch includes performing an appropriate sequential DIF patch if section type (SCT), a DIF sequence number (Desq) and a DIF block number (DBN) are missing; and
   e) forwarding application data and patch data for further processing.

8. The missing application data patching method of claim 7 wherein said communications packet is compliant with IEEE 1394 communication protocol standard.

9. The missing application data patching method of claim 7 wherein said patch data includes application default data.

10. The missing application data patching method of claim 7 wherein a first portion of information is from a received video frame, wherein said received video frame is missing a second portion of information, and said first portion is included in said application data.

11. A digital video computer system comprising:
    a means for communicating information;
    a means for capturing video information associated with an image and a sound, said means for capturing video information coupled to said means for communicating information;
    a means for processing information to determine if said video information is not received and providing patch video information, patching said missing video information including performing an appropriate sequential DIF patch if section type (SCT), a DIF sequence number (Desq) and a DIF block number (DBN) are missing including sequential values based upon video frame information, wherein said sequential values are calculated based upon a previous video frame, said means for processing information and patching missing video information coupled to said means for communicating information;

a means for displaying said image, said means for displaying said image coupled to said means for communicating information; and a means for transmitting said sound, said means for transmitting said sound coupled to said means for communicating information.

12. A digital video computer system of claim 11 wherein said patching includes retrieving a quantization value from an audio auxiliary field in an DIF block.

* * * * *